United States Patent [19]
Hardage et al.

[11] Patent Number: 4,736,570
[45] Date of Patent: Apr. 12, 1988

[54] AUTOMATIC COOKIE LOADING SYSTEM WITH DOUBLE DISCHARGE

[75] Inventors: Timothy W. Hardage, Athens; Charles T. Haley, Watkinsville; William D. Walker, Athens, all of Ga.

[73] Assignee: Food Machinery Sales, Inc., Athens, Ga.

[21] Appl. No.: 28,560

[22] Filed: Mar. 20, 1987

Related U.S. Application Data

[63] Continuation-in-part of Ser. No. 866,868, May 23, 1986, which is a continuation-in-part of Ser. No. 677,745, Dec. 3, 1984, Pat. No. 4,590,743.

[51] Int. Cl.⁴ ............................................. B65B 35/44
[52] U.S. Cl. .............................. 53/443; 53/500; 53/532
[58] Field of Search ............... 53/532, 443, 500, 254, 53/251; 198/427, 431, 424, 406

[56] References Cited

U.S. PATENT DOCUMENTS

| | | | |
|---|---|---|---|
| 2,404,232 | 7/1946 | Hunter | 198/31 |
| 2,747,352 | 5/1956 | Whitecar | 53/532 |
| 2,762,180 | 9/1956 | Hall | 53/202 |
| 2,834,164 | 5/1958 | Irmscher | 53/14 |
| 2,973,109 | 2/1961 | Gable | 214/8 |
| 3,113,660 | 12/1963 | Clements | 198/31 |
| 3,171,239 | 3/1965 | Krupp | 53/154 |
| 3,237,369 | 3/1966 | Stroop | 53/180 |
| 3,355,002 | 11/1967 | Greck | 198/31 |
| 3,416,286 | 12/1968 | Ciccone | 53/443 X |
| 3,500,984 | 3/1970 | Talbot | 198/32 |
| 4,098,392 | 7/1978 | Greene | 53/532 X |
| 4,226,073 | 10/1980 | Rose et al. | 53/532 |
| 4,356,682 | 11/1982 | Mancini | 53/443 |
| 4,356,907 | 11/1982 | Aidlin et al. | 198/427 |
| 4,391,560 | 7/1983 | Fardin | 53/532 X |

Primary Examiner—James F. Coan
Attorney, Agent, or Firm—Thomas & Kennedy

[57] ABSTRACT

Cookies (15) are carried in random spaced series on a surface belt conveyor (11) toward the delivery end of the conveyor. The cookies are diverted by diverter (18) to one side of the conveyor until a predetermined number of the cookies has been counted, whereupon the diverter diverts the cookies to the opposite side of the conveyor. The group of cookies on one side of the surface conveyor moves downwardly about the delivery end of the conveyor belt, between the overhead conveyor belts (25) and (26), so as to change the cookies from a horizontal attitude to an edge standing attitude, and the groups of cookies are received in edge standing attitude in the receptacles (58) or (59). The receptacles progressively move outwardly beneath the delivery end of the surface conveyor as the cookies are counted by photocells (28) or (29), and air nozzles (65) or (66) direct a stream of air toward the last received cookie to hold the cookie in an edge standing attitude. When the photocells (28) or (29) has counted the predetermined number of cookies, the receptacle (58) or (59) is rotated so as to discharge the cookies downwardly into an awaiting cookie tray (75).

17 Claims, 3 Drawing Sheets

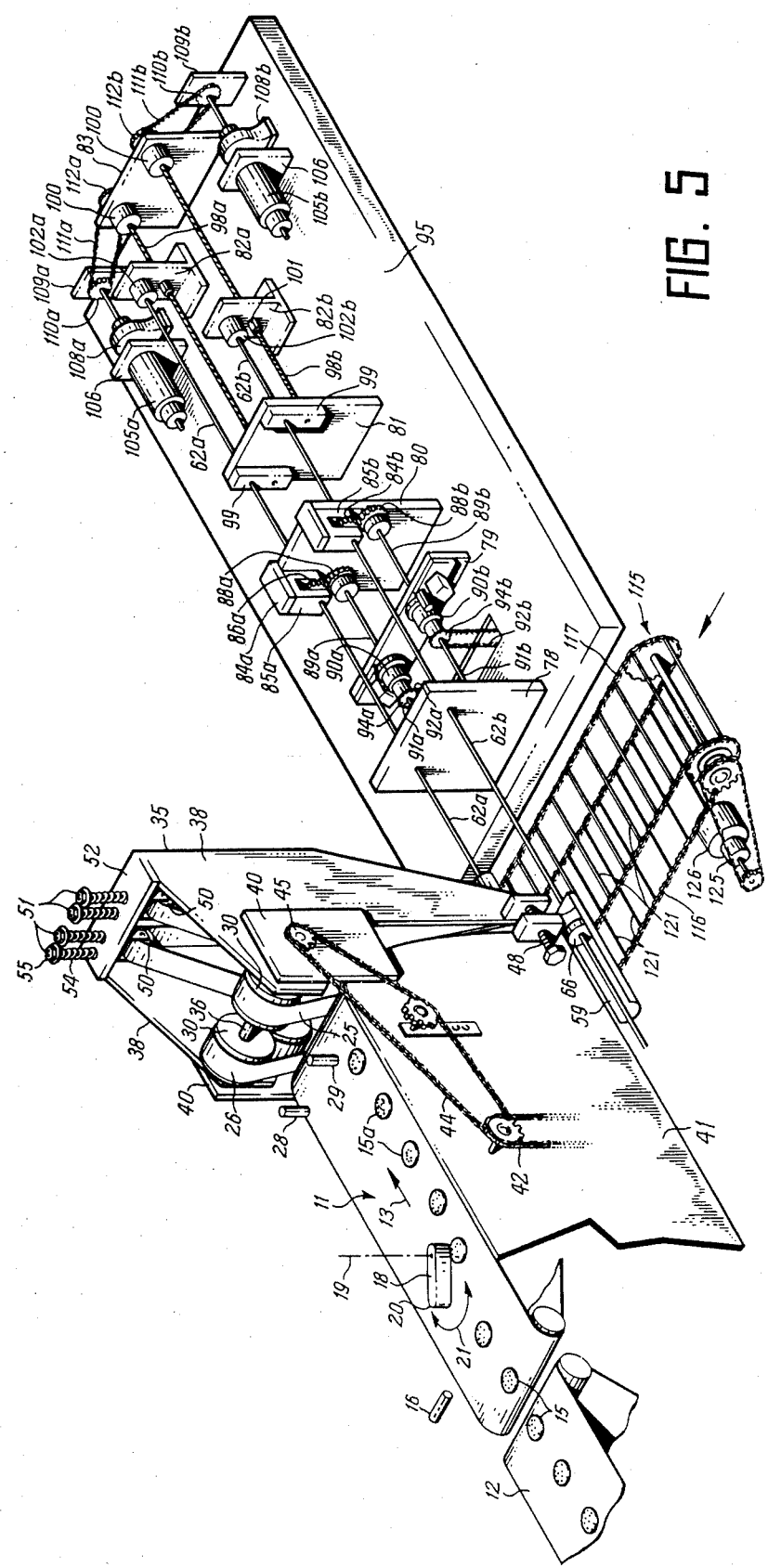

AUTOMATIC COOKIE LOADING SYSTEM WITH DOUBLE DISCHARGE

CROSS REFERENCE TO RELATED PATENTS

This application is a continuation-in-part of U.S. patent application Ser. No. 866,868 filed May 23, 1986, which application is a continuation-in-part of application Ser. No. 677,745 filed Dec. 3, 1984, now U.S. Pat. No. 4,590,743 issued May 27, 1986.

BACKGROUND OF THE INVENTION

In the commercial baking and packaging of cookies and similar items, a common procedure is to deposit dough on a plurality of parallel conveyor tapes, and move the tapes through a baking oven. When the dough emerges from the opposite side of the hot oven, the dough has been cooked so as to form edible cookies. Workers or automated machines then gather a predetermined number of the hot cookies and load them into the semicylindrical cells of cookies trays or other containers, and the loaded cookie trays are then placed in a bag and shipped to the retail market.

Some cookies of uniform size and shape and with relatively smooth exterior surfaces can be loaded by automatic equipment into the cookie trays. For example, U.S. Pat. Nos. 3,290,859, 3,500,984, 3,538,992, 3,927,508, 4,098,392, 4,413,462, 4,221,287, 4,394,899 and 4,413,462 all disclose various automated machines for loading articles into containers.

The prior art devices utilized for automatically loading cookies and the like into trays do not function very well when the cookies are of irregular, nonuniform shape, and of various sizes. For example, the relatively new commercially mass produced home style cookie which is baked with a substantially flat bottom surface but with an irregular top surface is more difficult to load into a package than cookies which are smooth on both top and bottom surfaces. An example of home style cookies is disclosed in U.S. Pat. No. 4,455,333, and the cookies might include nuts or chocholate chips or other items that forms lumps in the top surfaces of the cookies.

The prior art cookie loading equipment generally functions to gather and stack the cookies in bundles or groups at various stages prior to loading the cookies in the cell of the cookie tray that becomes part of the package, and if the home style cookie is being handled in this manner by the prior art equipment the irregular top surfaces of the cookies tend to occasionally cause the equipment to malfunction, or some of the cookies might become damaged as they are being loaded into a tray.

Typically, the prior art devices accumulate a large number of cookies in a stacked relationship, and then a predetermined number of the cookies at the leading end of the stack are separated from the other cookies by a shearing movement of the compressed stack. While this can be accomplished with cookies having smooth top and bottom surfaces, the more irregularly shaped cookies tend to become damaged because of the compressed shearing action. Further, this type of separation of irregularly shaped cookies might result in the incorrect number of cookies being gathered into a bundle and then placed in the cell of the package.

It is highly desirable to avoid contact between adjacent top and bottom surfaces of adjacent ones of the home style cookies during the packaging process. When contact is made between adjacent ones of the cookies in a cookie tray, it is desirable that only a minimum contact force be experienced between the cookies so as to avoid damaging the irregularly shaped, somewhat fragile top surface of each cookie.

Most of the known prior art loading devices require the cookies or other objects being loaded into a package to be moved in series at equal spacing so that the system can receive each cookie on a preplanned basis, with the components of the machinery operating in timed relationship with the equally spaced, constant velocity movement of the cookies into the equipment. If the cookies are not uniformly spaced as they are received continuously from the baking oven, usually the cookies are either reformed into equally spaced sequence or gathered in abutting relationship, as described above. This makes the loading equipment complex and requires more handling of the cookies.

SUMMARY OF THE INVENTION

Briefly described, the present invention comprises a cookie loading method and apparatus for loading cookies and the like received on a continuing basis from a cookie oven, with the cookies being received in random spaced, horizontal as baked attitude, in series, with the bottom surfaces of the cookies being substantially flat and resting on the conveyor tape that carries the cookies away from the cookie oven. The cookies ultimately are arranged in an accumulated edge standing horizontally stacked relationship in the cell of a cookie tray.

The cookies are received from the oven belts onto a conveyor belt for the loader, with the cookies being arranged in a random spaced series relationship, and then moved toward a package loading station. As the cookies continue toward the delivery end of the conveyor belt, the cookies are counted up to a predetermined number which is the number of cookies to be received in each loading cell of the packages. In response to the cookies having been counted up to the predetermined number, a diverter changes positions so as to divert the oncoming cookies from the centerline of the surface conveyor belt over to one side of the surface conveyor belt. This process is repeated so that the next predetermined number of cookies will be diverted to the opposite side of the conveyor belt. In this way, groups of cookies are positioned on alternate sides of the conveyor belt as the cookies move in random spaced series to the delivery end of a conveyor belt.

As the cookies reach the delivery end of the conveyor belt, the belt moves in a downward arc so as to change the attitude of the cookies from a horizontal or "as baked" attitude to a vertical or "edge standing" attitude. In order to stabilize the cookies as they move through the downward arc at the delivery end of the conveyor belt, a pair of duplicate overhead belts move into overlying relationship with the opposite side portions of the surface conveyor belt and lightly press against the cookies as they move downwardly through the delivery end of the surface conveyor belt, so as to control the movements of the cookies as they are discharged from the surface conveyor belt.

A pair of cookie receptacles are located beneath the surface conveyor belt and overhead conveyor belts and are positioned to receive the cookies as they are discharged from the belts. Each receptacle includes an elongated trough which is wide enough to receive the cookies in a horizontal, edge standing stack, and each receptacle moves in increments as the cookies are discharged from the conveyors so that a space is made in the receptacle as each oncoming cookie is received in the receptacle. In addition, a stream of air is directed along the length of each trough-shaped receptacle so as to engage the last received cookie, thereby urging the last received cookie to remain in its upright or edge standing attitude and to be lightly biased toward the previously received cookie. The stream of air assures that each cookie remains in its edge standing attitude and does not tip over and fall into the space for the next oncoming cookie.

When the receptacle has received the predetermined number of cookies, the receptacle is rotated so as to become inverted momentarily, and to dump the bundle of cookies to the cavity of a cookie tray immediately below the receptacle.

While one receptacle is operating as described above to receive one group of cookies from one side of the conveyor belt, the other receptacle is out of phase with the one receptacle and will be in the process of discharging its cookies and moving back to its start position.

The system operates in response to the count of cookies moving along the surface conveyor belt, so that should there be an unusually large space between adjacent ones of the oncoming cookies, the system simply waits for the next cookie before continuing its operation.

Thus, it is an object of this invention to provide an automated cookie loading method and apparatus for receiving cookies with irregularly shaped top surfaces in a horizontal, as baked attitude and turning each cookie to an edge standing attitude just prior to loading the cookie into an awaiting receptacle, substantially without hazard of damaging the irregularly shaped top surfaces of the cookies.

Another object of this invention is to provide a method and apparatus for loading cookies and similarly shaped items into a package in a high speed, reliable operation, substantially without hazard of damaging the cookies or improperly loading the cookies in the awaiting containers.

Another object of this invention is to provide a unique combination of elements which function in a novel manner to inexpensively and reliably load an awaiting package with cookies and similarly shaped items received from a baking oven or the like.

Another object of this invention is to provide a method and apparatus for receiving and loading cookies into a package from a surface conveyor belt with the cookies moving in random spaced relationship in series from the belt, with the system operating in response to the cookies moving through the system whereby the loading functions respond to the presence or absence of an oncoming cookie.

Other objects, features and advantage of the present invention will become apparent upon reading the following specification, when taken in conjunction with the accompanying drawings.

BRIEF DESCRIPTION OF THE DRAWINGS

FIG. 5 is a perspective illustration of the automated cookie loading system.

DETAILED DESCRIPTION

Figure 1:
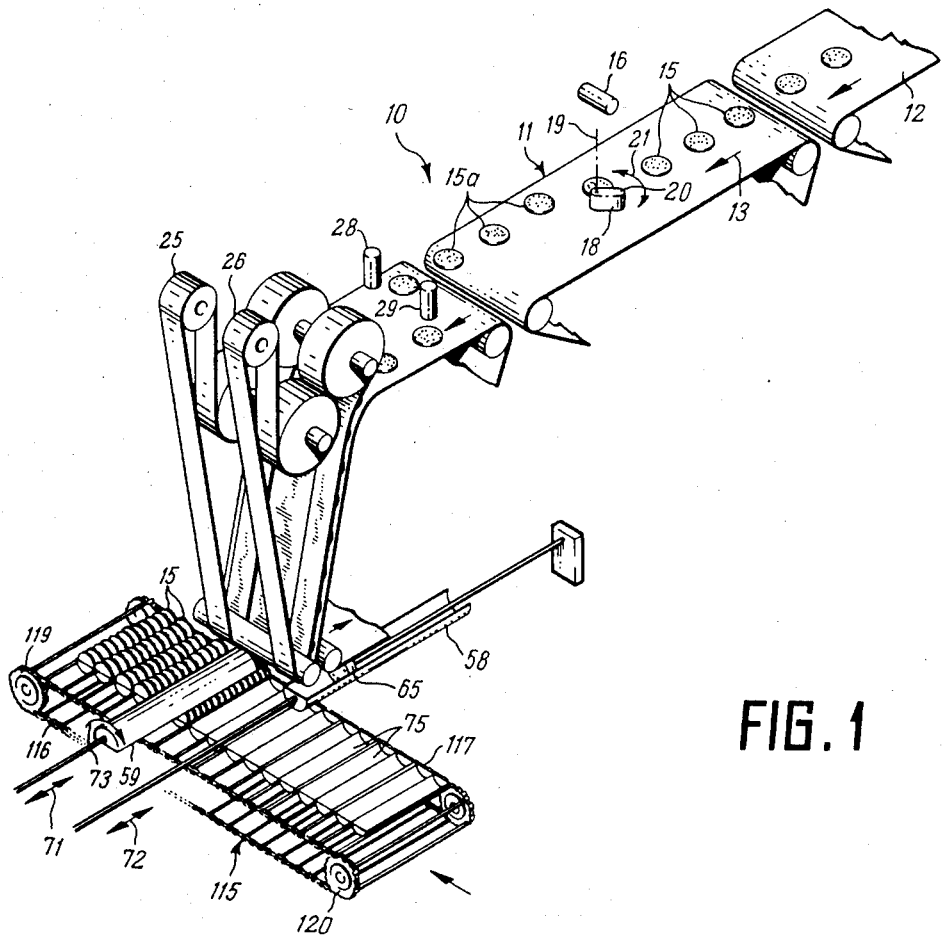
FIG. 1 is a schematic perspective illustration of the automatic cookie loading system.

Referring now in more detail to the drawings, in which like numerals indicate like parts throughout the several views, FIG. 1 illustrates the automatic cookie loading system 10 which includes a surface belt conveyor 11 driven usually at a constant velocity in the direction as indicated by arrow 13 by a drive motor (not shown), which receives cookies from a cooling belt conveyor 12. The cooling belt conveyor transports the cookies from the oven to the loading system. The cookies 15 are received in a random spaced series onto the surface belt conveyor 11, with the cookies being positioned substantially in the center portion of the belt. A photoelectric cell 16 is positioned along the run of conveyor belt 11 and detects each cookie 15 as it passes in front of the photocell. The signals from the photocell are counted by a control system (not shown). Solenoid actuated cookie diverter 18 is suspended over the belt conveyor 11 and is pivoted at one of its ends about vertical axis 19, so that its other end 20 swings in an arc 21 back and forth from one side to the other side of the belt conveyor 11. When the oncoming cookies 15 reach diverter 18, the cookies are urged to one side or to the other side of the belt 11, depending upon the position of the diverter. The control system counts the oncoming cookies 15 and shifts the diverter 18 after reaching a predetermined count. This counting and shifting function is performed continually so as to form groups of cookies, such as cookies 15a on one side of the belt conveyor. When the photocell 16 and its control system counts up to the predetermined number of cookies, the diverter 18 is shifted, so that a predetermined number of cookies will be diverted to one side of the belt and form groups of cookies on each side of the conveyor belt.

Figure 2:
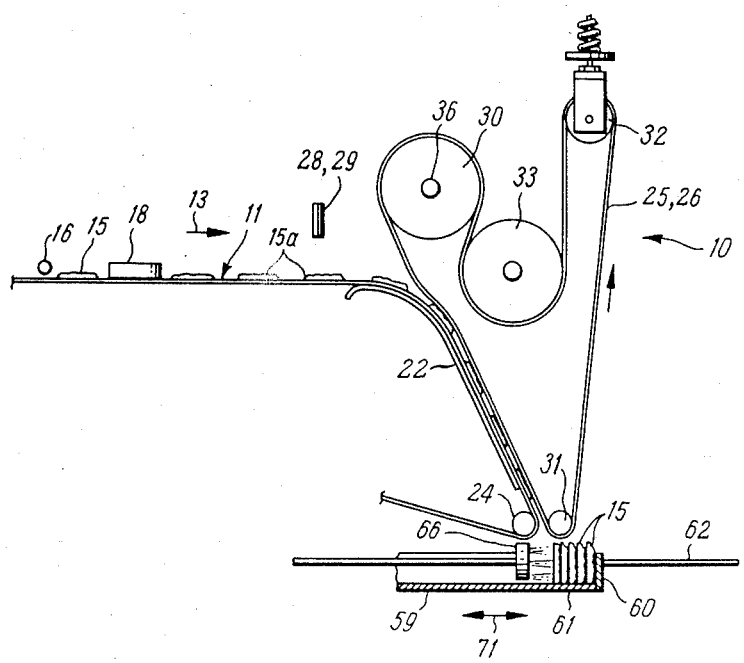
FIG. 2 is a partial side elevational view of the surface conveyor belt and the overhead belts of the automatic cookie loading system, showing how the cookies are moved through the delivery end of the surface conveyor belt into one of the receptacles.

As shown in FIG. 2, as the cookies on the surface conveyor 11 reach the delivery end of the conveyor, the conveyor turns about a guide 22 through a downwardly directed arc until the belt is oriented at about 25° from the vertical, and then the surface conveyor belt moves about a return sheave 24.

A pair of overhead or "control" conveyor belts 25 and 26 are located at the delivery end of the surface belt conveyor 11, with each overhead conveyor belt being positioned so as to be in alignment with the oncoming groups of cookies on opposite sides of the surface belt conveyor 11. The overhead conveyor belts 25 and 26 move into light engagement with the oncoming cookies, or with the surface belt conveyor if no cookies are present on the belt conveyor, as the cookies and surface belt conveyor move through the downward arc at the delivery end of the surface belt conveyor. This controls the cookies as they move through the downward arc and prevents the cookies from free falling at the delivery end of the surface belt conveyor.

A pair of photocells 28 and 29 are suspended over the surface belt conveyor just in front of the overhead conveyor belts 25 and 26 in positions which enable the photocells to detect the oncoming cookies 15 as they approach the delivery end of the surface belt conveyor.

Figure 3:
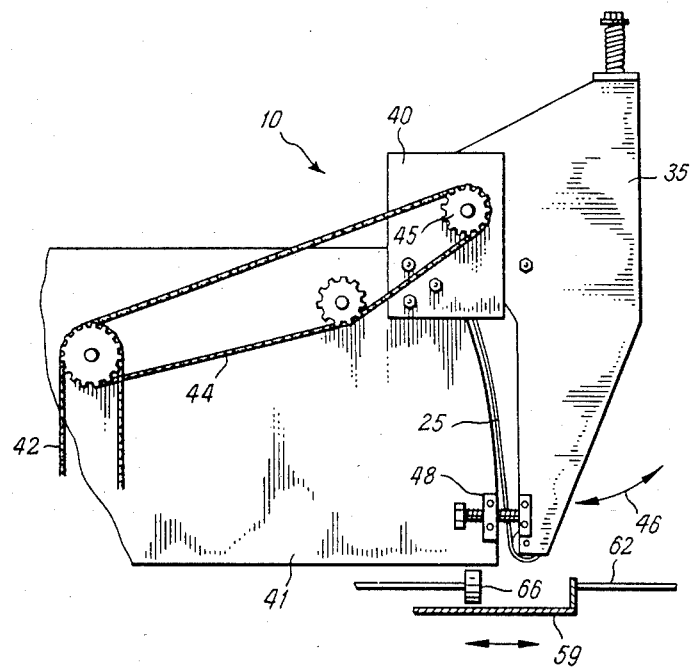
FIG. 3 is a schematic side elevational view, similar to FIG. 2, but showing the drive system for the overhead belts.

As illustrated in FIG. 2, the pair of overhead conveyor belts 25 and 26 each have a drive sheave 30 positioned at the upper portion of the downward arc 31 of the guide 22, a lower guide sheave 31, a tension guide sheave 32 and an idler sheave 33. As shown in FIGS. 3 and 5, the sheaves 30-33 for both overhead conveyor belts 25 and 26 are mounted in a common housing 35. A single drive axle 36 extends through both drive sheaves 30, and through side plates 38 of housing 35 and through side mounting plates 40 at opposite sides of the housing 35. The sides plates 40 are rigidly mounted to the frame 41 of the surface belt conveyor 11. With this arrangement, the entire common housing 35 is pivotably mounted on its own drive axle 36, with the drive axle 36 being rotatably mounted in the side mounting plates 40.

As illustrated in FIG. 3, a drive chain 42 which is driven by the surface belt conveyor motor (not shown) drives chain 44 which drives the sprocket 45 of drive axle 36 of the overhead conveyor belt 25. With this arrangement, the common housing 35 of the overhead conveyor belts 25 can tilt as indicated by double headed arrow 46, toward and away from the delivery end of the surface belt conveyor 11. An adjustable stop 48 is mounted between the frame 41 of the surface belt conveyor and the housing 35 of the overhead conveyor belts 25 so as to control the spacing between the lower ends of the overhead conveyor belts 25 and the surface belt conveyor 11 at the delivery end of the surface belt conveyor. Since the center of gravity of the overhead conveyor belts 25 is placed to one side of the drive axle 36, the lower end portion of the common housing 35 tends to pivot toward the discharge end of the surface belt conveyor 11.

In order to maintain the proper amount of belt tension in the overhead conveyor belts 25 and 26, the tension clevises 32 are each mounted in a clevis 50, and the sheaves each have rods 51 extending therefrom through openings in the upper cross plate 52 of the housing 35. Coil compression springs 54 surround each rod 51 and bear between the cross plate 52 and a holding nut 55 threaded onto the remote end of each rod 51. The springs therefore tend to apply a biasing force to lift the tension sheaves upwardly and therefore apply a biasing tension to the overhead conveyor belts 25 and 26. The amount of tension can be adjusted by tightening or loosening the holding nut 55.

Figure 4:
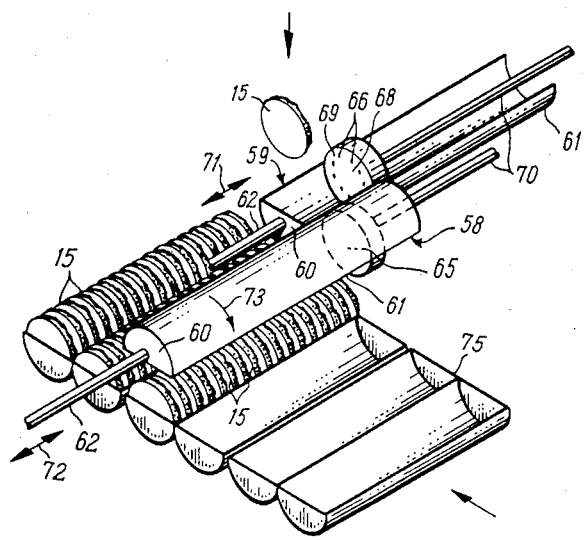
FIG. 4 is a partial perspective illustration of the receptacles of the automated cookie loading system, showing one receptacle as it receives a cookie, and the other receptacle as it discharges its bundle of cookies to the cavity of a cookie tray.

A pair of movable receptacles 58 and 59 are positioned beneath the overhead conveyor belts 25 and 26 in positions suitable for receiving the cookies 15 as the cookies are delivered by the surface belt conveyor 11 and overhead conveyor belts 25 and 26. Each receptacle 58 and 59 is shaped as an elongated, semicylindrical trough having an endwall 60 and a semicylindrical body 61 (FIG. 4). A support rod 62 has one end portion in abutment with and rigidly mounted to the endwall 60. The support rods 62 function to reciprocate and to rotate the receptacles 58 and 59, in a manner to be explained in more detail hereinafter.

Air nozzles 65 and 66 are each suspended in a receptacle 58 and 59, respectively, with the nozzles 65 and 66 being of a circular shape and of a diameter slightly smaller than the inside diameter of the semicylindrical body 61 of each receptacle 58 and 59. The air nozzles 65 and 66 each include a surface 68 that faces the endwall 60 of its receptacle 58 and 59, and the surface includes a plurality of air openings 69 therein. Each nozzle 65 and 66 is supported by a stationary hollow stem 70 that communicates interiorally of the nozzle and supplies air or other gas compatible with the system to the nozzle. Thus, the nozzles emit a stream of air into each receptacle 58 and 59, with the stream of air moving toward the endwall 60 of each receptacle.

As illustrated in FIGS. 1 and 4, the receptacles 58 and 59 reciprocate along the lengths as indicated by double headed arrows 71 and 72 and rotate as indicated by arrows 73. The cookies 15 received from the delivery end of the overhead conveyor belts 25 and 26 drop into the receptacles 58 and 59 in the space between the receptacle end wall 60 and its nozzle 65 or 66. The stream of air emitted from the air nozzle 65 or 66 tends to lightly urge the last received cookie toward the end wall 60 of its receptacle, so that the cookie tends to remain in an edge standing attitude in the receptacle. The diameter of the receptacle is slightly larger than the diameter of the cookies, so that the cookies tend to be collected in an edge standing, horizontal stack within the receptacle.

The receptacles 58 and 59 move in increments away from their respective nozzles 65 and 66 in response to the counting of the cookies by photocells 28 and 29 and the control system (not shown), so that each receptacle moves its end wall 60 by one increment away from the nozzle as each cookie is counted, so that a space is made within each receptacle for each oncoming cookie between the last received cookie and the nozzle 65 or 66. Thus, cookies are received in the receptacle substantially without cookies making contract with each other, and the streams of air tend to gently urge the last received cookie toward the previously received cookies or toward the end wall 60 of the receptacle so that the cookies tend to remain in edge standing relationship within the receptacle.

Once the predetermined count of cookies has been received within a receptacle 58 or 59, the receptacle will have been moved substantially away from its air nozzle 65 or 66 and over a cookie tray 75 which is immediately beneath the path of movement of the receptacles. When reaching this position after receiving the full amount of cookies, the receptacles 58 and 59 are rotated through 360°. When the open side surface of the receptacle 58 or 59 approaches an inverted attitude, the cookies are free to fall as a bundle into the cavity of the cookie tray 75.

Under optimum conditions, the cookies move continually in series through the system, with the system dividing the cookies into right and left bunches as they approach the delivery end of the surface belt conveyor, and as each bunch is collected in its receptacle 58 or 59, the other receptacle rotates to drop its cookies into the awaiting cavity of a cookie tray, and then moves back to a ready position.

As illustrated in FIG. 5, the elongated support rods 62a and 62b of the receptacles 58 and 59 are movably supported in bearings of support wall 78 and extend away from the receptacles 58 and 59 over second support wall 79, through third and forth support walls 80 and 81 to travel brackets 82a and 82b. A turning gear assembly 84a and 84b is attached to each support rod 62a and 62b. Each turning gear assembly includes a stationary clevis 85a, 85b and a sprocket 86a and 86b confined within the clevis, with the sprocket being slidably mounted to its support rod 62a and 62b by a slot and key arrangement, whereby the support rod can reciprocate through the sprocket, but the support rod and sprocket must rotate in unison. Operating sprocket 88a and 88b are positioned below and are meshed with sprockets 86a and 86b, and are mounted on drive shafts 89a and 89b. Drive shafts 89a and 89b are mounted at one end to support wall 80 and are mounted at their upper ends to rap spring clutches 90a and 90b which are supported on support wall 79. Drive shafts 91a and 91b are also suspended between the support wall 78 and support wall 79, and are connected to the rap spring clutches. Chain drives 92a and 92b engage sprockets 94a and 94b keyed to shafts 91a and 91b at substantially a constant speed by a motor (not shown) positioned below the work table 95. With this arrangement, when a clutch 90a or 90b is actuated, the continuously driven drive shaft 91a or 91b will be momentariarly connected through its rap spring clutch 90a or 90b to drive shaft 89a or 89b, and through the turning gear assembly 84a or 84b, the support rods 62a and 62b will be rotated through 360°, at which point the cam on the rap spring clutch will cause the clutch to disengage.

The actuation of the rap spring clutches 90a and 90b is from the photocells 28 and 29 and the control system, which functions to count the cookies passing about the delivery end of the surface belt conveyor 11. Once the count of cookies has reached the predetermined number of cookies and time has lapsed to permit the last counted cookie to move into a receptacle 58 or 59, the corresponding rap spring clutch 90a or 90b is actuated so as to rotate the receptacle.

Travel screws 98a and 98b are supported at their ends by support walls 81 and 83 in bearings 99 and 100. The travel screws 98a and 98b engage the travel brackets 82a and 82b, through the threaded socket 101 of each travel bracket, so that the travel bracket reciprocates in response to the rotation of its travel screw, with the direction of movement being controlled by the direction of rotation of the travel screw. The support rods 62a and 62b are rotatably received in the end bearings 102a and 102b which are mounted to the travel brackets 82a and 82b, respectively. Thus, when travel brackets 82a and 82b reciprocate in response to the rotation of travel screws 98a and 98b, the support rods 62a and 62b will also reciprocate, causing the receptacles 58 and 59 to reciprocate beneath the delivery end of the surface belt conveyor 11.

Servo motors 105a and 105b are mounted to work table 95 by support walls 106, and the output shaft of each servo motor is connected to a transmission 108a and 108b, with the shafts of the transmission being supported at their other ends by support wall 109a and 109b, respectively. The sprockets 110a and 110b are mounted to the shaft and drive the drive chains 111a and 111b and sprockets 112a and 112b which are connected to travel rods 98a and 98b. Servo motors 105a and 105b are reversible motors, and transmissions 108a and 108b function to increase the output velocity of the motors, causing the travel screws to operate at a high angular velocity.

Servo motors 105a and 105b operate in response to the detection and counting of the cookies by photocells 28 and 29 as the cookies move into the delivery end of the surface belt conveyor 11. As each cookie is detected and counted, the servo motor 105a or 105b is momentariarly energized so as to rotate the travel screw, which results in the receptacle moving a predetermined short distance or "step", so as to make room for the oncoming cookie. This permits the cookie to fall into an unoccupied space immediately adjacent the previously received cookie, and adjacent the nozzle 65 or 66. As the oncoming cookies are repeatedly counted, the process continues until the predetermined number of counts of cookies has been reached, whereupon the last step of the receptacle is made and then the receptacle is inverted, as described above, and the servo motor is reversed to return its receptacle to its ready position.

As illustrated in FIGS. 1 and 5, a tray conveyor 115 is positioned beneath the receptacles 58 and 59. The tray conveyor comprises a pair of conveyor chains 116 and 117 extending about sprockets 119 and 120, with conveyor pins 121 extending parallel to one another and mounted at their ends to the chains 116 and 117. The pins are spaced apart a distance that corresponds to the recesses formed in the bottom surfaces of the cookie trays 75, so that the cookie trays are supported by their recesses straddling the conveyor pins. The conveyor assembly progressively moves the cookie trays beneath the receptacles 58 and 59, thereby loading the bunches of cookies 15 into the cavities of the cookie trays.

The receptacles 58 and 59 of the system each load every other cavity of the cookie trays. In the embodiment disclosed herein, the receptacles 58 and 59 are spaced apart a distance greater than the separation of the adjacent cavities of the cookie trays, so that their spacings do not match the spacing of the cavities of the cookie trays. Therefore, a rap spring clutch 125 having two lobes is mounted in driven relationship between the servo motor 126 and the tray conveyor, so that when a photocell 28 or 29 and the control system detects the completion of a count of predetermined number of cookies, the clutch 125 will momentariarly engage between the servo motor 126 and the tray conveyor 115, causing the tray conveyor to advance an empty cell beneath the next receptacle 58 and 59 that is to be inverted to discharge a bunch of cookies from the receptacle to the cookie tray. The lobes of the rap spring clutch are placed so that the cookie trays will be advanced alternately the distances required to properly place an awaiting cavity of a cookie tray beneath the appropriate receptacle 58 or 59.

While this invention has been described as an automatic cookie loading system, it should be obvious to those skilled in the art that other type objects can be loaded by the system, including various biscuits, cookies and other items having either smooth or irregular surfaces. Further, it should be understood that the foregoing description relates only to a preferred embodiment of the present invention, and that numerous modifications or alterations may be made therein without departing from the spirit and scope of the invention as set forth in the appended claims.

We claim:

1. A method of loading cookies and the like in edge-standing attitude into a container comprising:
   moving the cookies on a surface conveyor in an as-baked attitude in a random spaced series,
   counting the cookies as they move on the surface conveyor,
   as the cookies reach the delivery end of the surface conveyor moving the cookies with the surface conveyor through a downwardly curved arc until the cookies are in an edge standing attitude, releasing the cookies from the surface conveyor in an edge-standing attitude, receiving the cookies from the surface conveyor in a receptacle in edge-standing aligned horizontally stacked bundle, and in response to counting a predetermined number of the cookies inverting the receptacle and dropping the bundle of cookies in edge-standing attitude into the container.

2. The method of claim 1 and as the cookies move on the surface conveyor alternately diverting predetermined numbers of the cookies to opposite sides of the surface conveyor to form a series of groups of cookies on opposite sides of the surface conveyor, and wherein the step of receiving the cookies from the surface conveyor in a receptacle comprises receiving the groups of cookies from one side of the surface conveyor in one receptacle and receiving the groups of cookies from the other side of the surface conveyor in another receptacle, and wherein the step of inverting the receptacle comprises inverting one receptacle as the cookies are being received in the other receptacle.

3. The method of claim 1 and wherein the step of receiving a predetermined number of the cookies from the surface conveyor in a receptacle comprises placing a semicylindrical receptacle beneath the delivery end of the surface conveyor with the open side of the receptacle facing upwardly and moving the receptacle in steps along its length as each cookie is received in the receptacle so that each on-coming cookie is received in an unoccupied space in the receptacle.

4. The method of claim 1 and further including the step of directing a stream of gas against the cookies as they are received in the receptacle in a direction that tends to maintain the cookies in an edge standing attitude.

5. A method of loading cookies and the like in edge-standing attitude into a container comprising:
moving cookies along a path on a surface conveyor in horizontal attitude in random spaced series,
moving groups of the cookies to alternate sides of the surface conveyor,
as the cookies reach the delivery end of the surface conveyor moving the cookies with the surface conveyor through a downwardly curved arc until the cookies are oriented in an edge-standing attitude,
releasing the cookies from the surface conveyor in an edge-standing attitude,
collecting the cookies of the groups of cookies from one side of the surface conveyor in an edge-standing attitude in an aligned horizontally stacked bundle in a first receptacle and collecting the cookies of the groups of cookies from the other side of the conveyor in an edge-standing attitude in an aligned horizontally stacked bundle in a second receptacle,
as one receptacle collects cookies inverting the other receptacle and dropping the bundles of cookies in edge-standing attitude into a container.

6. The method of claim 5 and wherein the step of moving groups of cookies to alternate sides of the surface conveyor comprises counting the cookies as they move along the surface conveyor up to a predetermined number, and in response to counting a predetermined number of cookies diverting the on-coming cookies to one side of the surface conveyor until the predetermined number of cookies is formed in a group of cookies on one side of the surface conveyor, and then in response to counting another predetermined number of cookies diverting the on-coming cookies to the other side of the surface conveyor until the predetermined number of cookies is formed in a group of cookies on the other side of the surface conveyor, and continuing the counting and diverting steps.

7. The method of claim 5 and wherein the step of moving the cookies with the surface conveyor through a downwardly curved arc comprises applying an upper surface conveyor to the surface conveyor and the cookies carried by the surface conveyor to form the conveyors in overlying relationship and moving the surface conveyors in unison about the downwardly curved arc, biasing the surface conveyors together about the cookies until the cookies have become reoriented from a horizontal attitude to an edge standing attitude, and separating the conveyors to release the cookies.

8. The method of claim 5 and wherein the steps of collecting the cookies in edge-standing attitude in the first and second receptacles comprise collecting the first cookie in each receptacle adjacent an end member with the first cookie leaning against the end member, and as each on-coming cookie moves into the receptacle moving the end member to make room for the on-coming cookie in the receptacle.

9. The method of claim 8 and further including the step of directing a flow of air through the receptacle toward the end member so as to apply the flow of air against the last collected cookie in the receptacle and urge the cookies to an edge standing attitude.

10. A method of loading cookies and the like in edge-standing attitude into a container comprising:
moving cookies in a horizontal attitude in series on a surface conveyor,
as the cookies reach the delivery end of the surface conveyor moving the cookies through a downwardly curved arc until the cookies are in an edge-standing attitude and releasing the cookies,
collecting the cookies in an elongated receptacle with an end wall and of a width adaptable to receive the cookies in edge-standing horizontally stacked bundle extending along the length of the receptacle with the first collected cookie leaning against the end wall,
directing a flow of gas along the length of the receptacle toward the end wall so as to urge each cookie as it is received in the receptacle toward an edge-standing attitude and leaning against the previously collected cookie, and,
after a predetermined number of cookies have been collected in the receptacle inverting the receptacle and dropping the bundle of cookies in edge standing attitude into a container.

11. Apparatus for loading cookies and the like in edge-standing attitude in a horizontally stacked bundle into a container comprising:
a surface conveyor for receiving and moving cookies in series in a horizontal attitude and including a delivery end for moving the cookies through a downward arc until the cookies have become reoriented to an edge-standing attitude,
a receptacle at the delivery end of said surface conveyor defining an elongated receptacle surface of a width sufficient to receive the cookies from said surface conveyor in edge-standing, horizontally stacked bundle, and
control means for moving said receptacle in increments in response to each cookie moving toward said receptacle so as to make room in said receptacle for each on-coming cookie and for inverting the receptacle in response to a predetermined number of said cookies having been delivered to said receptacle.

12. The apparatus of claim 11 and further including air nozzle positioned at one end portion of said receptacle for directing a stream of air against each cookie as each cookie is received in said receptacle and urging the last received cookie to remain in an edge-standing attitude and leaning against the previously received cookie.

13. The apparatus of claim 12 and wherein said receptacle comprises an elongated concave receptacle surface with an end wall at one end of said concave receptacle surface, and said air nozzle being sized and shaped to be received in said receptacle, and said control means including means for rotating said receptacle about said nozzle.

14. Apparatus of claim 11 and wherein said control means comprises counting means for counting the cookies moving with the surface conveyor up to a predetermined count, and diverter means for diverting the cookies alternately to opposite sides of the conveyor belt in response to said counting means reaching the predetermined count so as to arrange the cookies in groups at opposite sides of the surface conveyor, and wherein said receptacle comprises two receptacles with each receptacle positioned at one side of said surface conveyor delivery end in alignment with the on-coming cookies at each side of the surface conveyor.

15. Apparatus for loading cookies and the like in edge-standing attitude in a horizontally stacked bundles into containers comprising:

a surface conveyor for receiving and moving cookies in series in-a horizontal attitude, control means for counting the cookies up to a predetermined number of cookies;

a diverter responsive to said control means for diverting a predetermined number of the series of the cookies on the surface conveyor into groups of cookies on opposite sides of the conveyor, a pair of trough-shaped receptacles each positioned in line with the groups of cookies at the delivery end of said surface conveyor for receiving the cookies in an edge-standing horizontal stack, means responsive to said control means for moving said receptacles in steps along the lengths of the receptacles in response to each cookie moving into a receptacle, and means responsive to said control means for inverting said receptacles when the predetermined number of cookies has been delivered to the receptacle so as to discharge the cookies to a container or the like.

16. The apparatus of claim 15 and further including means for directing a stream of air along the length of each trough-shaped receptacle to maintain the cookies in an edge standing attitude.

17. The apparatus of claim 16 and wherein said trough-shaped receptacles are semi-cylindrical with a wall member at one end, and wherein said means for directing a stream of air along the length of each trough-shaped receptacle comprises an air nozzle positioned in each of said receptacles and including nozzle openings facing the wall member of the receptacle, whereby cookies are received in the receptacles between the end wall member and the nozzle and air emitted from the nozzle urges the last received cookie toward the end wall.

* * * * *